United States Patent Office 3,427,388
Patented Feb. 11, 1969

1

3,427,388
ESTERS OF BENZIMIDAZOLECARBAMIC ACID
AS MITE OVICIDES
John K. Scoggin, Wilmington, Del., assignor to E. I. du
Pont de Nemours and Company, Wilmington, Del., a
corporation of Delaware
No Drawing. Continuation-in-part of application Ser. No.
548,069, May 6, 1966. This application Apr. 11, 1967,
Ser. No. 629,926
U.S. Cl. 424—273          5 Claims
Int. Cl. A01n 9/02, 9/08, 9/22

ABSTRACT OF THE DISCLOSURE

Monocarboxy esters, dicarboxy esters and tricarboxy esters of 2-aminobenzimidazole and the salts and chelates of these esters are useful as mite ovicides.

Cross reference to related applications

This application is a continuation-in-part application of my copending application Ser. No. 548,069, filed May 6, 1966, now abandoned.

Background of the invention

This invention relates to methods of using benzimidazolecarbamates to prevent or mitigate damage to plants and inanimate organic materials by mites.

The survival of man has for a long time been dependent in a large measure upon his ability to protect from the various agents of destruction, the plants, animals and their products which satisfy his basic needs. With our rapidly increasing population it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

I have discovered that application of benzimidazolecarbamates within the scope of this invention, surprisingly, entirely preclude or reduce the damage to plants and inanimate organic materials due to mites. These compounds prevent mite populations from expanding or reduce them to a low level or even eliminate them by preventing the normal hatching of their eggs, i.e., the compounds are mite ovicides.

The methods of this invention also make possible the control of damage by mites with an amazingly small amount of chemical and with surprisingly little effort. These advantages are due in large measure to the fact that the compounds when properly applied, can enter and move about in plants. This means that an entire plant can be protected from mites with a simple application of the chemical to only a part of it, i.e., the compounds are systemic.

Brief summary of the invention

It has been found that the above outstanding mite ovicidal activity can be obtained by applying to a locus of mite infestation, i.e., the area where mites are present or where their presence is to be prevented, a mite ovicidal amount of the compounds represented by the following formula:

FORMULA I

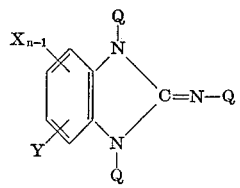

wherein
X is selected from the group consisting of hydrogen, halogen, and alkyl groups containing 1 through 4 carbon atoms;

$n$ is a whole positive number less than 5, that is 1, 2, 3 or 4, and with the proviso that when X and Y are alkyl their total carbon content be no more than 6 carbon atoms;

Y is selected from the group consisting of hydrogen, alkoxy of 1 through 4 carbon atoms, chlorine, methyl and nitro;

The Q's can be the same or different and are selected from the group consisting of hydrogen, —COOR$_1$, —COOR$_2$, —COOR$_3$ and M, with the proviso that not more than one Q is M and at least one is an alkoxycarbonyl group;

M is a cation that forms a salt or chelate with the esters; and

R$_1$, R$_2$ and R$_3$ are the same or different aliphatic radicals containing from 1 through 16 carbon atoms optionally substituted with chlorine, bromine, fluorine, hydroxy, cyano, or alkoxy of 1 through 4 carbon atoms; benzyl optionally substituted with halogen, alkoxy of 1 through 4 carbon atoms, alkyl of 1 through 4 carbon atoms or nitro; phenyl optionally substituted with halogen, alkoxy of 1 through 4 carbon atoms, alkyl of 1 through 4 carbon atoms or nitro.

It will be understood that the above structure may exist in two tautomeric forms.

FORMULA II

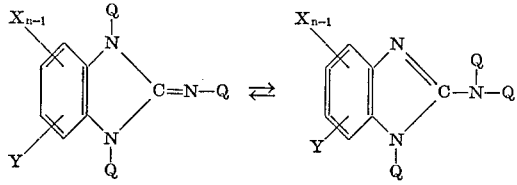

Mixtures of the above two isomers can also be used as mite ovicides. Thus useful mite ovicidal mixtures of isomers can be obtained, for example, by reacting anhydrous 2-benzimidazolecarbamic acid ester sodium salts with an alkyl chloroformate as follows:

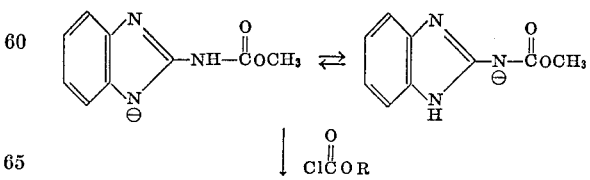

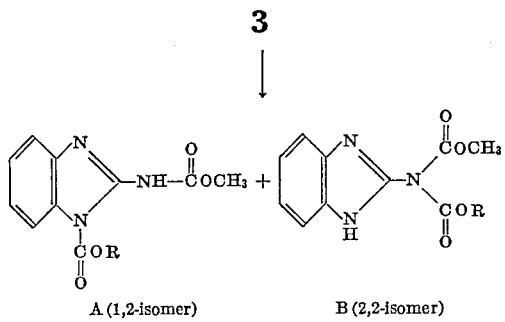

A (1,2-isomer)     B (2,2-isomer)

Although isomers A and B above can be separated by chromatographic methods, the mixtures obtained can be used directly. For the sake of clarity and brevity, all of the compounds in the specification have been named as having the 1,2-disubstituted or 1,2,3-trisubstituted configuration. However, the scope of this invention includes the corresponding 2,2-disubstituted or 2,2,3-trisubstituted isomers for each structure.

In the above formulae, M is selected from the group consisting of simple metal ions, complexed metal ions capable of additional coordination.

Suitable simple metal ions include ferrous, ferric, manganese, zinc, nickel, chromium, cobalt, cuprous, cupric, calcium, barium, aluminum, magnesium, silver, sodium and potassium. Complexed metal ions capable of additional coordination include species such as partially hydrated metal ions, i.e., $[Ni(H_2O)_4]^{++}$, $[Cu(H_2O)_2]^{++}$, $[Mn(H_2O)_2]^{++}$ basic metal ions, i.e., $[Cu(OH)]^+$, $[Cr(OH)]^{++}$, $[Al(OH)]^{++}$, $[Zn(OH)]^+$, metal ions containing other coordinated groups, i.e., $[Zn(NH_3)_2]^{++}$, $[Co(ethylenediamine)]^{+++}$, $[Fe(C_2O_4)]^+$, and combinations of the above, i.e., $[Cu(OH)(H_2O)]^+$, $$[Fe(C_2O_4)(H_2O)_2]^+$$

$$[Co(CO_3)(H_2O)_2]^+, [Cr(OH)(H_2O)]^{++}$$

$$[Cu(H_2O)(dimethylformamide)]^{++}$$

Preferred within the above formulae are those compounds where X and Y are hydrogen; one Q is hydrogen or M; another Q is $COOR_4$, where $R_4$ is selected from the group consisting of alkyl of 1 through 12 carbon atoms, β-hydroxyethyl, vinyl, allyl, propargyl, butenyl, and benzyl; the Q at the 2-nitrogen position is $COOR_5$ where $R_5$ is alkyl of 1 through 4 carbon atoms; and M is selected from the group consisting of simple metal ions and complex metal ions capable of additional coordination.

Most preferred are the compounds where X, Y and one of the Q's are hydrogen, and the Q's attached at the 1 and 2 nitrogen positions are $COOR_6$, and $COOR_7$, where $R_6$ and $R_7$ may be the same or different and are methyl or ethyl.

The following is a list of compounds particularly preferred for use according to the methods of the invention:

1-methoxycarbonyl-2-benzimidazolecarbamic acid, methyl ester
1-ethoxycarbonyl-2-benzimidazolecarbamic acid, methyl ester
1-ethoxycarbonyl-2-benzimidabzolecarbamic acid, ethyl ester
1-methoxycarbonyl-2-benzimidazolecarbamic acid, ethyl ester
1-(3-chloroethyloxycarbonyl)-2-benzimidazolecarbamic acid, methyl ester
2-carboxyamino-1-benzimidazolecarboxylic acid, dimethyl ester zinc complex
2-carboxyamino-1-benzimidazolecarboxylic acid, dimethyl ester copper complex
1-amyloxycarbonyl-2-benzimidazolecarbamic acid, methyl ester
1-allyloxycarbonyl-2-benzimidazolecarbamic acid, methyl ester
1-propargyloxycarbonyl-2-benzimidazolecarbamic acid, methyl ester
1-isoproplyloxycarbonyl-2-benzimidazolecarbamic acid, methyl ester
1-methoxycarbonyl-2-benzimidazolecarbamic acid, propyl ester
1-methoxycarbonyl-2-benzimidazolecarbamic acid, isopropyl ester
1-methoxycarbonyl-2-benzimidazolecarbamic acid, sec.-butyl ester
1-hexyloxycarbonyl-2-benzimidazolecarbamic acid, methyl ester
1-(3-hydroxypropoxycarbonyl)-2-benzimidazolecarbamic acid, methyl ester
1-n-butoxycarbonyl-2-benzimidazolecarbamic acid, tert. butyl ester Detailed description of the invention The compounds of the present invention can be prepared by a number of routes. Thus, the 1,3-substituted diesters and triesters of Formula I can be prepared by reacting a 2-aminobenzimidazole, an alkyl chloroformate, and an acid acceptor in accordance with the sequence of reactions set forth in assignee's U.S. patent, Klopping 2,933,504.

This patent discloses other methods of preparing these compounds and further methods can be found in U.S. patent, Klopping 2,933,502 and Loux 3,010,968. The preparation disclosure of these patents is incorporated herein by reference.

As mentioned previously, it has been found that the compounds within the scope of this invention possess outstanding mite ovicidal activity when employed to prevent or mitigate damage to plants and inanimate organic materials. Also compounds within the scope of the invention have exhibited systemic mite ovicidal activity, a unique type of activity that heretofore has been only rarely found.

The paragraphs which follow describe the utility of this invention in more detail.

The mite ovicidal action of the compounds within the scope of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs have been treated with one of these compounds, or if they were laid on a surface containing one of these compounds. Further they will not hatch if they are laid by a female mite that has been in contact with one of these compounds or laid by a female mite that is ingesting or has recently ingested food, such as plant juices, containing one of these compounds. This interference with the hatching of eggs prevents the population from increasing significantly beyond that present at the time of treatment. Thus, this ovicidal action, along with the high natural mortality of adults, can largely eliminate mites from an already infested area over a relatively short period of time. Further, as long as the compounds are present on the surface the mites occupy or remains in their food supply, new populations cannot develop.

Many species of mites which cause damage to fruits, field crops, vegetables and ornamentals under a wide variety of circumstances, are controlled by the methods of this invention. The extent of the practical utility of the mite control obtained is represented by, but is not intended to be limited to, the following listing of specific susceptible mites along with the types of damage that they may cause; *Panonychus ulmi* (European red mite) and *Tetranychus bimaculatus* (two spotted mite) which are commonly called "orchard mites," these mites attack a great many deciduous tree fruits including apples, pears, cherries, plums and peaches; *Tetranychus atlanticus* (Atlantic or strawberry spider mite) *T. cinnabarinus* (carmine spider mite) and *T. pacificus* (Pacific spider mite), these mites attack cotton and numerous other crop plants; *Paratetranychus citri* (citrus red mite) and others which attack citrus; *Bryobia praetiosa* (clover mite) which attacks clover, alfalfa, and other crops, *Acevia neocynodonis* which attacks grasses and other plants; *Tyrophagus lintneri* which is a serious pest in stored foods and on cultivated mushrooms, and *Lepidoglyphus destructor* which injures Kentucky bluegrass seed in storage.

The active compounds when applied by certain of the methods of this invention, enter and move freely within plants, i.e., they are systemic. Thus the mite population can be controlled on plants in parts well removed from the point of application. In view of this activity these compounds can be applied to seeds, thus the treatment of cucumber seeds with a few grams per 50 kilograms of seed of one of the active compounds provides control of mites on the resulting plants for periods in excess of 40 days. Applications to soil also provide control of mites on the plants growing in the treated soil. Spray or dust treatments of plant foliage impart protection against mites to other foliage on the plant not actually sprayed and to new foliage developing later.

There are important practical advantages associated with the use of an effective systemic pesticide. Thus successful application to seed as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also with tall plants, such as shade trees, where the spray will not reach to the top. Therefore, great savings both in chemical cost and ease of application are possible with compounds capable of systemic performance.

The compounds of this invention provide protection from damage caused by mites when applied to the proper locus by the methods described hereinafter and at a sufficient rate to exert the desired mite ovicidal effect. They are especially suited for the protection of living plants such as fruit bearing trees, nut bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be protected from mites by applying one or more of the active compounds to the soil in which they are growing or in which they may subsequently be seeded or planted; or to seeds, tubers, bulbs or other plant reproductive parts prior to planting; as well as to foliage, stems and/or fruits of the living plant. Living plants can also be protected by dipping the root system or physically injecting the chemical or chemicals into roots or stems.

Preferred rates for application of the compounds of this invention to soil in which plants are or will be growing range from 0.01 to 500 parts per million by weight of the soil in which the roots are or will be growing. More preferred use rates are in the range of 0.1 to 50 parts per million and the most preferred rates are in the range of 0.25 to 25 parts per million.

Preferred rates for application to seeds, tubers, bulbs, or other plant reproductive parts range from 0.03 to 5700 grams of active compound of this invention per 45.35 kilograms of planting material treated. More preferred rates are in the range of 0.3 to 2800 grams of active compound per 45.35 kilograms. The most preferred rates are in the range of 2.8 to 1400 grams per 45.35 kilograms.

Applications are made from dusts, granules, pellets, slurries or solutions. Such treatments protect the treated parts themselves from damage due to mites and in addition impart extended protection against the mites to the resulting new plants.

Preferred rates for application of the compounds of this invention to foliage, stems and fruits of living plants range from 0.012 to 60 kilograms of active ingredient per hectare. More preferred rates are in the range of 0.025 to 30 kilograms per hectare and the most preferred rates are in the range of 0.5 to 15 kilograms per hectare. The optimum amount within this range depends upon a number of variables which are well-known to those skilled in the art of plant protection. These variables include, but are not limited to, the type of mite to be controlled, weather conditions expected, the type of crop, stage of development of the crop and the interval between applications. Applications within the range given may need to be repeated one or many more times at intervals of 1 to 60 days.

Preferred rates for dip applications to roots of living plants are in the range of 0.45 to 18,200 grams of active ingredient per 380 liters of water or other liquid carrier. More preferred rates are in the range of 4.5 to 9000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, roots and the like, harvested for food or feed, are protected from the deterioration caused by mites during processing, distribution and storage by treatment with an active compound of this invention. The plant parts to be so protected can be dipped in a liquid bath containing the active ingredient, dusted with a finely divided preparation of the active ingredient, sprayed or misted with an aerosol containing the compound or enclosed in wrapping or packaging materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active and the most preferred rates are in the range of 0.2 to 2.5%.

Leather, fabric, fiber board, paper and other industrial materials of an organic nature can be protected from infestation by mites by coating, incorporating or impregnating with an effective amount of one or more of the compounds of this invention. The coatings can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50% with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30% by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are also protected from infestation by mites by the active compounds of this invention. Again, either surface or deep protection can be obtained. Surface treatment is by dips, sprays, washes, aerosol or dust application. Deep treatment is accomplished by penetrating solutions. Dips, sprays and washes contain the active compounds of the invention at rates of 10 to 5,000 parts per million. Fluids for aerosol application and dusts contain 0.1 to 20% by weight. Penetrating solvent solvents contain an amount of the active ingredient that results in a deposit of 5 to 20,000 parts per million of the material to be protected.

Damage by mites to stored organic products such as grain, seed, bulbs, tubers, meat or animal hides is kept to a minimum by treating the floors, walls, portions and other parts of warehouses or other structures with one or more of the active compounds. Applications are made by the use of dusts, sprays or aerosols with preferred use rates in the range of 0.05 to 1,000 grams of the active compound of this invention per 93 square meters of surface to be kept free of excessive mite populations.

As was previously set forth, the compounds within the scope of the invention are especially suited for use in living plants. Applications to the foliage, stems and fruit of plants at the rates indicated above is generally accomplished by employing sprays, dusts or aerosols containing the proper amount of active ingredient. For the control of mites which are regularly present, applications often start prior to the time that the problem actually appears and continue on a predetermined schedule. Such a procedure is termed "preventive" or "protective."

With the compounds of this invention, successful control of mites can also be accomplished by applications made after they are present. This approach or effect is termed "curative" or "eradicant" and permits the user to realize considerable savings.

Curative control of plant infestations with the compounds of this invention is enhanced if the treated plant parts are moist for one or more periods of 2 to 12 hours each soon after the active compound is applied. Often the slow drying of an original spray treatment or natural occurring rains, mist, fogs or dews will accomplish this. Under other circumstances, such as during dry priods or in shelters such as greenhouses, it is necessary to keep the plants moist by some special effort for best results.

When the compounds of this invention are applied, their activity can be enhanced by using certain adjuvants, for example in the water in which the active ingredients are dispersed. These adjuvants may be surface active agents, oils, humectants, enzymes, carbohydrates, and organic acids. They improve the performance on tubers, on foliage, in treatments used for dip application to roots of living plants, in the case of liquid used for injection into the roots or stems of living plants, or in mixtures used to treat fruits, tubers, bulbs, roots, and the like, after harvest.

Surface active agents that enhance mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide polypropylene oxide combinations, alkylsulfonates, fluorocarbon surfactants, glycerol esters ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbintol derivatives, sulfosuccinates, alcohol sulfates, sulfated fatty esters, sulfated and sulfonated oils and fatty acids, alkyl benzene sulfonates, imidazolines, taurates, ethoxylated mercaptans, ethoxylated amines and amides, modified phthalic glycerol alkyl resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycollic and gluconic acids. Although the precise manner in which these additives improve the performance of the active ingredients is not known, the effect is, nevertheless, startling, and it is possible that these additives improve the penetration into the plant or translocation throughout the plant of the active ingredients.

Preferred surface active agents to improve the mite ovicidal activity of these compounds are products such as dioctyl sodium sulfossucinates ("Aerosol" OT and "Aerosol" OT–B), blends of aromatic sulfonates and ethylene oxide derivatives ("Agrimul" GM, "Agrimul" A–100, "Agrimul" N–100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon" AP78), sodium N-methyl-N-oleoyl turate ("Igepon" T77), sodium salt of sulfated lauryl and myristyl colamide ("Intramine" Y), polyethylene glycol 400 oleic acid ester ("Nonisol" 210), sodium dodecylbenzone sulfonate ("Sul-Fon-Ate" AA 10, "Ultrawet" K), polyoxyethylene ethers with long-chain alcohols ("Surfonic" LR-30, "Alfonic" 1012-6, "Brij" 30, "tergitol" TMN), ethylene oxide condensates with propylene oxide/ethylene diamine condensates ("Tetronic" 504), polyhydric alcohol esters ("Trem" 014), modified phthalic glycerol alkyd resins ("Triton" B 1956), quaternaries ("Zelec" DP), alkylphenol ethylene oxide condensates ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "detergents and Emulsifiers," 1965 Annual, or 1966 Annual, published by John W. McCutcheon Inc., 236 Mt. Kemble Avenue, Morristown, N.J.

Preferred oils include spray oils such as "Orchex" 796 made emulsifiable with "Triton" X–45, castor oil made emulsifiable with "Triton" X–114, corn oil made emulsifiable with "Triton" X–114, Volck Oil #70, Sunoco Oil No. 7E and similar nonphytotoxic spray oils of vegetable, animal or mineral origin.

The preferred rates for these surfactants when used in sprays are in the range of from 10 to 100,000 parts per million of the spray fluid. More preferred rates are in the range of 30 to 30,000 parts per million and the most preferred rates are in the range of 100 to 10,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

The compounds of this invention and the oils, humectants, enzymes, carbohydrates, and acids useful to enhance the mite-ovicidal activity of these compounds can be brought together in several ways. For example, the additive which will enhance activity can be mixed with active ingredients when spray slurries are being prepared. It is often also possible and convenient to produce formulations in which the additive and the active ingredient will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredient compound to additives may vary widely. Thus, the additive may be present in such mixtures within the range of from 33 to 10,000 parts per 100 parts of active ingredient. More preferred are rates of from 40 to 5,000 parts of additive per 100 parts of active ingredient and a range of ratios from 50 to 3,500 per 100 parts of active is even more preferred.

As previously mentioned, the methods of the invention provide sysemic control of mites. Thus applications to plants can be accomplished by spraying or dusting above-ground parts (such as foliage, stems and fruit). For such applications, the presence of a surface active agent in the spray or dust enchances activity. Use rates for the surface-active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of mites on plants is also accomplished by application to seeds, tubers, bulbs, or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection, through irrigation water, or by distribution on the field surface.

The mite ovicidal compositions of the invention contain in sufficient amount to exert mite ovicidal action, one or more of the above-described compounds in admixture with a carrier material or conditioning agent of the kind used and commonly referred to in the art as a mite ovicide adjuvant or modifier. The general classes of adjuvants applicable to the compounds of this invention are inert solids, organic liquid solvents, organic liquid or aqueous diluents and surface-active agents. Formulations adapted for ready and efficient application using conventional applicator equipment are prepared by compounding the componds of this invention with suitable adjuvants by mixing, grinding, stirring or other conventional processes. Normally, the active ingredient composes 1–95% by weight of the mite ovicidal composition.

Solid compositions may be in the form of water-dispersible powders, dusts, pellets and granules. Water-dispersible powders are particularly useful and can be prepared by simple mixing and grinding steps and can be either used as such, diluted with inert solids to form dusts or granules, or suspended in a suitable liquid medium for spray or seed treatment application. The powders usually comprise the active ingredient admixed with varying amounts of conditioning agents, surface-active agents and stabilizers. The classes of extenders suitable for the wettable powders of this invention and clays, such as kaolin, diatomaceous earth, and also synthetic silicas and silicates. Diluents of organic origin such as walnut shell flour can also be used.

The active ingredient usually makes up from about 25–90% of these wettable powder compositions. These wettable powders can also be converted to dusts containing 1–25% of active material by mixing or grinding with pyrophyllite, volcanic ash, ground phosphate rock, and other dense, rapid-settling inert solids. Alternatively, dusts can be prepared by grinding the dust diluents with the active ingredient, or by preparing dust concentrates for further dilution. These dust concentrates can contain from 80–95% of the active ingredient, blended and ground with diluents and, if desired, small amounts of surface-active agents.

For the granule compositions of this invention, the most suitable carriers are of two types. The first are porous, adsorptive, preformed granules, such as preformed and screened granular clay or heat expanded, granular, screened vermiculite or granular botanicals, such as corn cob. On any of these a solution or aqueous suspension of the active agent can be sprayed at concentrations up to 25 weight percent of the total weight. In addition to the active components the solutions or suspensions can contain surfactant and also binders such as swollen starch to aid in adhering small particles of dispersed product to the dried granules. Such adhesive materials may also be surfactants and include such products as polyvinyl alcohol, sodium and calcium, and magnesium lignin sulfonate in admixture with wood sugars, acrylate and asphalt emulsions, abietates, etc. Oils or other non-volatile liquids like glycols can also be used to improve adhesion.

The second suitable type of carrier is the powdered kaolinitic clays, or bentonitic clays, in the sodium, calcium or magnesium forms. These clays are blended with the active components and optionally surfactants to give mixtures that are granulated and dried to yield granular material with the active component distributed uniformly throughout the mass. Such granules can also be made with 25 to 30 weight percent active component, but more frequently a concentration of about 10 weight percent is desired for optimum distribution. Similar compositions can be made by extruding the mixture in the presence of moisture, and converting the extrusions into granules or pellets by a suitable combination of cutting, drying, and crushing steps. The granular compositions of this invention are most useful in a size range of 15 to 60 mesh.

Liquid compositions employing one or more of the mite ovicidally active compounds of this invention are prepared by admixing the active ingredient with a suitable liquid diluent medium. The active ingredient can be either in solution or in suspension in the liquid medium. Typical of the liquid media which may be used are water, paraffinic spray oils, alkylated naphthalenes, xylene, alcohols, chlorinated hydrocarbons and ketone. The active ingredient usually makes up from about 0.5 to 50% of these liquid compositions. In addition, surface active agents, particularly emulsifiers, may be present to aid in the suspension or dispersion or to emulsify the composition into water.

Compositions of the invention, especially liquids and wettable powders, contain as a conditioning agent one or more surface-active agents in amounts sufficient to render a given composition readily dispersible in water or in oil. By the term "surface-active agent," it is understood that wetting agent, dispersing agents, suspending agents and emulsifying agents are included.

Suitable surface-active agents include anionic, cationic and non-ionic types. In general, less than 10% by weight of the surface-active agent is present in the compositions of this invention, although frequently the amount of surface-active agent in these compositions is less than 2% by weight. However as previously described, higher levels of surfactant relative to the active component often gives unusual and unexpected beneficial results. Such compositions have greater mite ovicidal effectiveness than can be expected from a consideration of the activity of the components used separately.

Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Preferred wetting agents are alkylbenzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium calcium and magnesium lignin sulfonates, polymeric alkylnaphthalene sulfonates, sodium naphthalene sulfonate, polyvinylpyrrolidone derivatives, polymethylene bisnaphthalenesulfonate, and sodium-N-methyl - N - (long chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1 weight percent of the extender may be replaced by a corrosion inhibitor or an antifoaming agent, or both.

Emulsifying agents most suitable for the liquid compositions of this invention are alkylaryl polyethoxy alcohols, condensation products of ethylene oxide with long chain alkyl alcohols mercaptans or amines; sorbitan fatty acid esters; polyoxyethylene sorbitan fatty acid esters, polyethylene glycol fatty esters, fatty alkylol amide condensates, amine salts of fatty alcohol sulfates, and oil soluble salts of petroleum sulfonates. Mixtures of emulsifying agents are often preferred. Such emulsifying agents will comprise from about 3 to 10 weight percent of the total composition. As described above, however, greater amounts of emulsifying agent can be used to give improved results.

Such compositions can contain, in addition to the active ingredient of this invention, conventional insecticides, miticides, bacteriocides, nematocides, fungicides or other agricultural chemicals such as fruit set agents, fruit thinning compounds, fertilizer ingredients and the like, so that the compositions can serve useful purposes in addition to the control of mite infestations. The following are illustrative of the agricultural chemicals that may be included in compositions of the compounds of this invention or, additionally, that may be added to sprays containing one or more of the compounds of this invention.

1,2,3,4,10,10-hexachloro-1,4,4a,5,8,8a-hexahydro-1,4 - endoexo-5,8-dimethanonaphthalene (aldrin);
1,2,3,4,5,6-hexachlorocyclohexane (lindane);
2,3,4,5,6,7,8,8-octachloro-4,7-methano-3a-4,7,7a - tetrahydroindane;
1,1,1-trichloro-2,2-bis(p-chlorophenyl)ethane (DDT);
1,2,3,4,10,10-hexachloro-6,7-epoxy-1,4,4a,5,6,7,8,8a - octahydro-1,4-endo-exo - 5,8 - dimethanonaphthalene (dieldrin);
1,2,3,4,10,10-hexachloro-6,7-epoxy-1,4,4a,5,6,7,8,8a - octahydro-1,4-endo-endo-5,6 - dimethanonaphthalene (endrin);
1 (or 3a),4,5,6,6,8,8-heptachloro - 3a,4,7,7a - tetrahydro-4,7-methanoindene;
1,1,1 - trichloro - 2,2 - bis(p - methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate ("Sevin"®);
methylcarbamic acid, ester with phenol, 4-(dimethylamino)-3,5-dimethyl;
methylcarbamic acid, ester with 1,3-dithiolan-2-one oxime;
O,O-diethyl-O-(2-isopropyl-4-methylpyrimid-6-yl) thiophosphate;
O,O-dimethyl-1-hydroxy-2,2,2-trichloroethyl phosphonate;
O,O-dimethyl-S-(1,2-dicarbethoxyethyl)dithiophosphate (malathion);
O,O-dimethyl-O-p-nitrophenyl thiophosphate (methyl parathion);
O,O-dimethyl-O-(3-chloro-4-nitrophenyl)thiophosphate;
O,O-diethyl-O-p-nitrophenyl thiophosphate (parathion);
di-2-cyclophentenyl-4-hydroxy-3-methyl-2-cyclopenten-1-one chrysanthemumate;
O,O-dimethyl-O-(2,2-dichlorovinyl)phosphate (DDVP);
mixture containing 53.3% "Bulan," 26.7% "Prolan" and 20.0% related compounds;
O,O-dimethyl-O-(2,4,5-trichlorophenyl)phosphorothioate;
O,O-dimethyl-S-(4-oxo-1,2,3-benzotriazine-3(4H)-ylmethyl)-phosphorodithioate ("Guthion"®);
bis(dimethylamino)phosphonous anhydride;
O,O-diethyl-O-(2-keto-4-methyl-7-a'-pyranyl)thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-[2-(ethylmercapto)-ethyl]thiophosphate;
2,4-dinitro-6-sec-butyl phenol;
toxaphene;
O-ethyl-O-p-nitrophenylbenzenethiophosphonate;
4-chlorophenyl-4-chlorobenzene sulfonate;
p-chlorophenyl-phenyl sulfone;
tetraethyl pyrophosphate;
1,1-bis(p-chlorophenyl)ethanol;
1,1-bis(chlorophenyl)-2,2,2-trichloroethanol;
p-chlorophenyl-p-chlorobenzyl sulfide;
bis(p-chlorophenoxy)methane;
3-(1-methyl-2-pyrrolidyl)pyridine;
mixed ester of pyrethrolone and cinerolone keto- alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamyl)thiolacetohydroxamate;
p-dimethylaminobenzenediazo sodium sulfonate;
quinone oxyaminobenzooxohydrazone;
tetraalkyl thiuram disulfides such as tetramethyl thiuram disulfide or tetraethyl thiuram disulfide;
metal salts of ethylene bisdithiocarbamic acid, e.g. manganese, zinc, iron and sodium salts;
pentachloronitrobenzene;
n-dodecylguanidine acetate (dodine);
N-trichloromethylthiotetrahydrophthalimide (captan);
phenylmercury acetate;
2,4-dichloro-6-(o-chloroaniline)-s-triazine ("Dyrene"®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide;
3,3'-ethylenebis(tetrahydro-4,6-dimethyl-2H-1,3,5-thiodiazine-2-thione);
methylmercury dicyandiamide;
N-ethylmercury-p-toluenesulfonilide;
1,4-dichloro-2,5-dimethoxy benzene;
metal (e.g. iron, sodium and zinc), ammonium and amine salts of dialkyl dithiocarbamic acids;
tetrachloronitroanisole;
hexachlorobenzene;
hexachlorophene;
methylmercury nitrile;
tetrachloroquinine;
N-trichloromethylthiophthalimide;
1,2-dibromo-3-chlorophrene;
1,2-dibromo-3-chloropropene;
dichloropropane-dichloropropene mixture;
ethylene dibromide;
chloropicrin;

sodium dimethyl dithiocarbamate;
tetrachloroisophthalonitrile;
1-benzimidazole carboxylic acid, 2-carboxyamino-
   dimethyl ester streptomycin;
2-(2,4,5-trichlorophenoxy)propionic acid;
p-chlorophenoxyacetic acid;
1-naphthaline acetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The effetctiveness of the compounds of Formula I in preventing mite reproduction and controlling mite infestation is clearly demonstrated by the field and laboratory tests of the following examples.

Example 1

The following formulation is prepared by intimately blending the ingredietnts and grinding the blend in an air attrition mill until the particle size is substantially less than 5 microns.

|   | Percent |
|---|---|
| 1 - methoxycarbonyl - 2 - benzimidazolecarbamic acid, methyl ester | 50 |
| Oleic acid ester of sodium isethionate | 2 |
| Sodium lauryl sulfate | 1 |
| Synthetic fine silica | 47 |

The above 50% wettable powder formulation is dispersed in water to give an active ingredient concentration of 200 grams per 100 liters of water. Eight uniform Red Delicious apple trees in a Delaware orchard are selected for testing. Four of these are sprayed to run-off, which is approximately 2850 liters per hectare, at intervals of one and two weeks during the growing season with the above formulation and the other four trees are left unsprayed. By the end of the growing season, the unsprayed trees have developed very high populations of mites, averaging fourteen adults and nineteen eggs per leaf, of the European red mite, *Panonychus ulmi*. Due to the feeding of the mites, the foliage is russeted and drops prematurely. Also, the untreated trees have poor twig growth and small fruit.

The trees sprayed with 1-methoxy-2-benzimidazolecarbamic acid, methyl ester are essentially free of mites or eggs. As a result of the excellent mite control, the sprayed trees have foliage of a thrifty, dark green color, and they exhibit good twig growth and fruit size.

The following compounds when similarly formulated and used give like results.

1-isopropyloxycarbonyl-2-benzimidazolecarbamic acid, methyl ester
1-methoxycarbonyl-2-benzimidazolecarbamic acid, propyl ester
1-methoxycarbonyl-2-benzimidazolecarbamic acid, ethyl ester
1-ethoxycarbonyl-2-benzimidazolecarbamic acid, sec-butyl ester
1-hexyloxycarbonyl-2-benzimidazolecarbamic acid, methyl ester
1-phenoxycarbonyl-2-benzimidazolecarbamic acid, methyl ester Example 2

A wettable powder formulation is prepared from the following ingredients in the proportions given:

|   | Percent |
|---|---|
| 1 - ethoxycarbonyl - 2 - benzimidazolecarbamic acid, methyl ester | 25 |
| Methyl O-(methylcarbamyl)thioacetohydroxamate | 10 |
| Sodium dioctyl sulfosuccinate | 2 |
| Sodium ligninsulfonate | 2 |
| Diatomaceous silica | 61 |

All ingredients are combined and rotated in a blender until uniformly admixed. The total mix is then air-milled to produce particles most of which are less than 40 microns in particle size.

A sufficient amount of the above wettable powder is added to water such that there are 2.5 grams per liter of water of the methyl O-(methylcarbamyl)thioacetohydroxamate. The resulting suspension is then sprayed at weekly intervals on one of a pair of similar, adjacent plots in a greenbean field in Florida at the rate of two kilograms of 1-ethoxycarbonyl-2-benzimidazolecarbamic acid, methyl ester per hectare. The test area is selected as one in which there is a high infestation of the two-spotted mite, *Tetranychus bimaculatus* and the Mexican bean beetle, *Epilachna varivestis*. The plot sprayed with the above formulation remains free of both the two-spotted mite and the Mexican bean bettle for the entire growing season and provides a good yield of greenbeans. The unsprayed plot is attacked by both of the above pests and is damanged to the extent that the yield is greatly reduced. Similar areas sprayed with methyl O-(methylcarbamyl)thioacetohydroxamate alone are free from attack by the Mexican bean beetle but are damaged by the two-spotted mite.

The following compounds may be substituted for 1-ethoxycarbonyl - 2 - benzimidazolecarbamic acid, methyl ester in the above formulation and when used as described above give similar results:

1-amyloxycarbonyl-2-benzimidazolecarbamic acid, methyl ester
1-allyloxycarbonyl-2-benzimidazolecarbamic acid, methyl ester
1-propargyloxycarbonyl-2-benzimidazolecarbamic acid, methyl ester
1-(3-chloroethoxycarbonyl)-2-benzimidazolecarbamic acid, methyl ester
1,3-di-(methoxycarbonyl)-2-aminobenzimidazoline
1-(octylcarbonyl)-2-benzimidazolecarbamic acid, methyl ester Example 3

A wettable powder formulation is prepared from the following ingredients in the proportions given:

|   | Percent |
|---|---|
| 1 - methoxycarbonyl - 2 - benzimidazolecarbamic acid, isopropyl ester | 30 |
| Methoxychlor | 30 |
| Oleic acid ester of sodium isethionate | 2 |
| Sodium lauryl sulfate | 1 |
| Non-swelling montmorillonite clay | 37 |

All the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermuda grass turf area in Florida. The area selected for the test is heavily infested with a plant-feeding mite, *Aceria neocynodonis*, and chinch bugs, *Blissus leucopterus insularis*. The chinch bugs are killed in the treated plot and the mite infestation soon disappears. The turf quickly returns to a healthy and attractive condition. In a similar untreated plot both the mites and the chinch bugs continue to multiply and, by their feeding, the Bermuda grass becomes discolored and the turf reflects many unsightly dead spots. Similar plots sprayed with methoxychlor only, are free of damage due to chinch bugs but are injured by the high mite infestation.

Example 4

The following formulation is prepared by intimately blending the ingredients and grinding the blend in an air attrition mill until the particle size is substantially less than 5 microns.

|  | Percent |
|---|---|
| 1 and 2-methoxycarbonyl-2-benzimidazolecarbamic acid, methyl ester mixture | 50.0 |
| Alkyl naphthalene sulfonic acid, sodium salt | 1.5 |
| Sodium N-methyl-N-oleoyl taurate | 2.0 |
| Synthetic fine silica | 46.5 |

The above 50% wettable powder formulation is dispersed in water to give an active ingredient concentration of 2.0 grams per liter of water. Eight uniform apple trees of the same variety are selected for testing. Four of these are sprayed to run-off, which is approximately 2850 liters per hectare, at weekly intervals during the growing season with the above formulation and the other four trees are left unsprayed. By the end of the season the unsprayed trees have developed very high populations of orchard mites.

Due to the feeding of the mites, the foliage is russeted and drops prematurely. Also, the untreated trees have poor twig growth and small fruit. The trees sprayed with 1-methoxycarbonyl-2-benzimidazolecarbamic acid, sec-butyl ester are essentially free of mites or eggs.

The following compounds are formulated as wettable powders in a like manner and when used as indicated above give good mite control.

5-chloro-1-(methoxycarbonyl)-2-benzimidazolecarbamic acid, methyl ester;
1-(methoxycarbonyl)-2-benzimidazolecarbamic acid, methyl ester ½ silver nitrate complex;
1-(methoxycarbonyl)-5-methyl-2-benzimidazolecarbamic acid, methyl ester;
1-(methoxycarbonyl)-5,6-dimethyl-2-benzimidazolecarbamic acid, methyl ester;
1-(methoxycarbonyl)-5-nitro-2-benzimidazolecarbamic acid, methyl ester;
1-(methoxycarbonyl)-5-methoxy-2-benzimidazolecarbamic acid, methyl ester;
4,5,6,7-tetrachloro-1-(methoxycarbonyl)-2-benzimidazolecarbamic acid, methyl ester;
1-methoxycarbonyl-2-benzimidazolecarbamic acid, 2-butoxy ethyl ester;
1-methoxycarbonyl-2-benzimidazolecarbamic acid, 2-(2-bromoethyl) ester;
5-bromo-1-(methoxycarbonyl)-2-benzimidazolecarbamic acid, methyl ester;
5-butoxy-1-(methoxycarbonyl)-2-benzimidazolecarbamic acid, methyl ester;
5-butyl-1-(methoxycarbonyl)-2-benzimidazolecarbamic acid, methyl ester;
5-chloro-1-(methoxycarbonyl)-6-methyl-2-benzimidazolecarbamic acid, methyl ester;
5,6-dibromo-1-(methoxycarbonyl)-2-benzimidazolecarbamic acid, methyl ester;
1-(butoxycarbonyl)-5-nitro-2-benzimidazolecarbamic acid, methyl ester;
5-bromo-1-(methoxycarbonyl)-2-benzimidazolecarbamic acid, methyl ester;
5-butoxy-1-(methoxycarbonyl)-2-benzimidazolecarbamic acid, methyl ester;
5-butyl-1-(methoxycarbonyl)-2-benzimidazolecarbamic acid, methyl ester;
5,6-dibromo-1-(methoxycarbonyl)-2-benzimidazolecarbamic acid, methyl ester;
5-chloro-1-(methoxycarbonyl)-6-methyl-2-benzimidazolecarbamic acid, methyl ester;
1-(butoxycarbonyl)-5-nitro-2-benzimadzolecarbamic acid, methyl ester;
5-fluoro-1-(methoxycarbonyl)-2-benzimidazolecarbamic acid, methyl ester;
1-(methoxycarbonyl)-4,5,6,7-tetramethyl-2-benzimidazolecarbamic acid, methyl ester;
1-benzyloxycarbonyl-2-benzimidazolecarbamic acid, methyl ester;
5,6-dichloro-1-(ethoxycarbonyl)-2-benzimidazolecarbamic acid, methyl ester;
1-(2-cyanoethoxycarbonyl)-2-benzimidazolecarbamic acid, methyl ester;
1-(2-hydroxyethoxycarbonyl)-2-benzimidazolecarbamic acid, methyl ester;
1-(3-methoxyethoxycarbonyl)-2-benzimidazolecarbamic acid, methyl ester;
1-(3-methoxypropylcarbonyl)-2-benzimidazolecarbamic acid, methyl ester;
1-methoxycarbonyl-2-benzimidazolecarbamic acid, 2-methoxyethyl ester;
1-(2-chloroethoxycarbonyl)-2-benzimidazolecarbamic acid, 2-chloroethyl ester;
1-(2-chloroethoxycarbonyl)-2-benzimidazolecarbamic acid, 3-methoxypropyl ester;
1-methoxycarbonyl-2-benzimidazolecarbamic acid, 2-cyanoethyl ester;
2-benzimidazolecarbamic acid, 2-methoxyethyl ester;
2-benzimidazolecarbamic acid, isopropyl ester, copper complex;
2-benzimidazolecarbamic acid, methyl ester, iron complex;
2-benzimidazolecarbamic acid, methyl ester, zinc complex;
1-(2-cyanoethoxycarbonyl)-2-benzimidazolecarbamic acid ethyl ester;
5,6-dimethyl-2-benzimidazolecarbamic acid, methyl ester;
2-carboximino-1,3-benzimidazolinedicarboxylic acid, trimethyl ester;
1-methoxycarbonyl-3-n-propoxycarbonyl-2-benzimidazolinecarbamic acid, 3-bromopropyl ester;
1-tert-butoxycarbonyl-3-methoxycarbonyl-2-benzimidazolinecarbamic acid, amyl ester;
1,3-diethoxycarbonyl-2-benzimidazolinecarbamic acid, methyl ester;
1,3-dimethoxycarbonyl-2-benzimidazolinecarbamic acid, ethyl ester;
1,3-amyloxycarbonyl-2-benzimidazolinecarbamic acid, methyl ester;
2-benzimidazolecarbamic acid, methyl ester, manganese complex;
1,3-di-(β-chloroethoxycarbonyl)-2-benzimidazolinecarbamic acid, isopropyl ester;
2-benzimidazolecarbamic acid, methyl ester;
2-benzimidazolecarbamic acid, ethyl ester;
2-benzimidazolecarbamic acid, methyl ester, copper complex;
2-benzimidazolecarbamic acid, isopropyl ester;
2-benzimidazolecarbamic acid, allyl ester;
2-benzimidazolecarbamic acid, sec.-butyl ester;
2-benzimidazolecarbamic acid, iso.-amyl ester;
1-(benzyloxycarbonyl)-2-benzimidazolecarbamic acid, isopropyl ester;
1-(o-chlorobenzyloxycarbonyl)-2-benzimidazolecarbamic acid, methyl ester;
1-(benzyloxycarbonyl)-2-benzimidazolecarbamic acid, methyl ester;
1-(o-nitrobenzyloxycarbonyl)-2-benzimidazolecarbamic acid, methyl ester;
1-(p-methybenzyloxycarbonyl)-2-benzimidazolecarbamic acid, methyl ester;
1-(p-bromobenzylocarbonyl)-2-benzimidazolecarbamic acid, methyl ester;
1-(p-methoxybenzyloxycarbonyl)-2-benzimidazolecarbamic acid, methyl ester;

1-(3,5-dichlorophenoxycarbonyl)-2-benzimidazolecarbamic acid, methyl ester;
1-(m-tolyloxycarbonyl)-2-benzimidazolecarbamic acid, methyl ester;
1-(p-tolyloxycarbonyl)-2-benzimidazolecarbamic acid, methyl ester;
1-(p-methoxyphenoxycarbonyl)-2-benzimidazolecarbamic acid, methyl ester;
1-(p-bromophenoxycarbonyl)-2-benzimidazolecarbamic acid, methyl ester;
1-(p-isopropylphenoxycarbonyl)-2-benzimidazolecarbamic acid, methyl ester;
1-(p-nitrophenoxycarbonyl)-2-benzimidazolecarbamic acid, methyl ester;
1-(hexadecyloxycarbonyl)-2-benzimidazolecarbamic acid, methyl ester;
1-(dodecyloxycarbonyl)-2-benzimidazolecarbamic acid, methyl ester;
1-(dodecenyloxycarbonyl)-2-benzimidazolecarbamic acid, methyl ester;
1-(3-fluoroethoxycarbonyl)-2-benzimidazolecarbamic acid, methyl ester.

Example 5

The formulation of 2-benzimidazolecarbamic acid, methyl ester prepared as described in Example 4 is added to water in an amount to provide 1 gram of active chemical per liter of water. "Trem" 014 (polyhydric alcohol esters) is added to this suspension at the rate of 0.5 gram per liter of water. The "Trem" 014 is employed as a surfactant and penetrant to improve the performance of the 2-benzimidazolecarbamic acid, methyl ester.

The suspension with the "Trem" 014 is sprayed on alternate trees in an apple orchard at intervals of 1 to 2 weeks throughout the growing season. The trees thus treated remain free of mites and have healthy foliage. The adjacent trees not receiving this treatment are heavily infested with mites and show foliage damage due to mite activity.

Example 6

The following formulation is prepared by intimately blending the ingredients and grinding the blend in an air attrition mill until the particle size is substantially less than 5 microns and then reblending.

| | Percent |
|---|---|
| 1-methoxycarbonyl-2-benzimidazolecarbamic acid, methyl ester | 85.0 |
| Sodium N-methyl-N-oleoyl taurate | 2.0 |
| Alkyl naphthalene sulfonic acid, sodium salt | 1.5 |
| Synthetic fine silica | 11.5 |

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus bimaculatus* are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage.

The number of eggs laid by each batch of 50 mites is essentially the same. A sufficient time is allowed for all viable eggs to hatch. Counts demonstrate that none of the eggs hatch from among those laid by mites that had fed on foliage from pots with soil containing the above formulation. Hatch to provide living young was complete on the other hand, among eggs laid by mites similarly handled except that the plants providing sustenance were not in contact with the formulation. This experiment demonstrates systemic movement in plants and mite ovicide effect.

Example 7

A dust formulation is prepared as follows:

| | Percent |
|---|---|
| 1-(methoxycarbonyl)-2-benzimidazolecarbamic acid, methyl ester, zinc complex | 20 |
| Pyrophyllite | 79 |
| Alkyl naphthalene sulfonic acid, sodium salt | 1 |

Equal parts of the active ingredient and the extender are milled with the surfactant and then diluted with the remaining pyrophyllite in a ribbon blender. The components are then blended until they are homogeneous.

Cotton plants in selected plots are thoroughly dusted at a rate of ten kilograms of dust per hectare for each application on June 20 and at two-week intervals thereafter until mid-August with the above dust formulation in addition to a regular insecticidal program. Similar plots receive the insecticide application only. By late August the plots receiving the insecticide only have high populations of spider mites, Tetranychus spp., which cause the leaves of the cotton plants to turn rusty brown, twist and drop to the ground. The loss of leaves results in the shedding of small bolls and prevents the lint from becoming fully developed.

Cotton plants treated with the above dust formulation retain healthy foliage and produce a heavy crop of healthy full sized bolls.

The following compounds may be similarly formulated and when used as above give like results.

2-carboxyamino-1-benzimidazolecarboxylic acid, dimethyl ester, copper complex;
1-methoxycarbonyl-2-benzimidazolecarbamic acid, propyl ester.

Example 8

A dust formulation is prepared from the following ingredients in the proportions listed:

| | Percent |
|---|---|
| 1-(3-chloroethyloxycarbonyl)-2-benzimidazolecarbamic acid, methyl ester | 5 |
| Captan | 5 |
| Carbaryl | 5 |
| Sodium alkylnaphthalenesulfate | 1 |
| Pyrophyllite clay | 84 |

The above ingredients are combined and rotated in a blender until uniformly mixed. The composition is then air-milled to produce particles essentially less than 50 microns in diameter.

The above-prepared dust is then applied to a special planting of tea roses. The planting consists of uniform plots each with three varieties of rose. The test period extends from June 1 to August 31. At the end of the test period the roses in all unprotected plots are seriously damaged by the spider mite, *Tetranychus bimaculatus*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing captan and carbaryl, but without the 1-(3-chloroethyloxycarbonyl)-2-benzimidazolecarbamic acid, methyl ester, are free of blackspot and show no Japanese beetle injury. However, they are seriously damaged by mites.

The following compounds may be individually substituted for 1-(3-chloroethyloxycarbonyl)-2-benzimidazolecarbamic acid, methyl ester in the above formulation and when used as indicated, give like results.

1-ethoxycarbonyl-2-benzimidazolecarbamic acid, ethyl ester;
1-methoxycarbonyl-2-benzimidazolecarbamic acid, ethyl ester;

1-(3-chloroethyloxycarbonyl)-2 - benzimidazolecarbamic acid, ethyl ester;
2-carboxyamino-1-benzimidazolecarboxylic acid, dimethyl ester zinc complex;
2-carboxyamino-1-benzimidazolecarboxylic acid, dimethyl ester copper complex.

Example 9

A granular formulation is prepared as follows:

| | Percent |
|---|---|
| Granular corn cob (15–30 mesh) | 90 |
| 1-hexyloxycarbonyl-2-benzimidazolecarbamic acid, methyl ester | 10 |

The active compound is dissolved in warm chloroform and the chloroform solution is sprayed on the granular corn cob which is being tumbled in a mixer. Evaporation of the chloroform yields a finished granule in which the active ingredient is adsorbed.

A field in California is seeded with cotton in the normal manner, except that granules prepared as described above are added to alternative rows. These granules are dropped in such a way that some fall into the furrow and some are mixed with the covering soil. The rate of granule application is such as to employ 0.45 kilogram of active ingredient per 3600 linear meter of row. The remaining rows are untreated.

Six weeks after planting many of the plants in the rows without the granules have heavy population of the Pacific spider mite (*Tetranychus pacificus*). In the rows that had received the granules, all plants are healthy and free of mites. The effect on mites is clearly systemic.

The following compounds may be similarly formulated and when used as above give good results.
1-(3-hydroxypropoxycarbonyl)-2-benzimidazolecarbamic acid, methyl ester;
1-(n-butoxycarbonyl)-2-benzimidazolecarbamic acid, tert-butyl ester.

Example 10

The following ingredients are blended together and sand milled until the particle size of the active ingredient is less than 10 microns. The resulting composition when poured into water produces an emulsion in which the oil droplets contain suspended active material.

| | Percent |
|---|---|
| 1-isopropyloxycarbonyl - 2 - benzimidazolecarbamic acid, methyl ester | 25 |
| Soltrol 130 | 65 |
| Polyethylene glycol fatty ester | 10 |

3.78 liters of the above liquid composition is diluted with 19 liters of water, and the resulting emulsion is used to spray the walls, ceilings, nests, roosts, and floor of a chicken house known to be heavily infested with the chicken mite, *Dermanyssus gallinae*. One month after the application the chicken house is free of mites and remains so for an extended period.

The following compounds can be similarly formulated and when used as indicated above give good control of mites.
1-n-butoxycarbonyl-2-benzimidazolecarbamic acid, tert-butyl ester;
1-(3-hydroxypropoxycarbonyl)-2-benzimidazolecarbamic acid, methyl ester.

Example 11

An aerosol is perpared from the following ingredients in the porportions given:

| | Percent |
|---|---|
| 1-ethoxycarbonyl-2-benzimidazolecarbamic acid, methyl ester | 3.0 |
| methylene chloride | 22.0 |
| Freon 11 (trichloromonofluoromethane) | 37.5 |
| Freon 12 (dichlorodifluoromethane) | 37.5 |

The active ingredient is dissolved in the methylene chloride and then loaded into the aerosol container. This is followed by cold loading of the Freons.

Alternative rose bushes growing in a greenhouse are misted lightly at weekly intervals with hte aerosol described above. After two months of this program the treated plants are healthy, with drak green attractive foliage and are growing well. The untreated plants, on the other hand, have much foliage yellowed due to attack by the Atlantic mite, (*Tetranychus atlanticus*). Due to the extensive foliage damage, the plants not treated with the compound of this invention grow much more slowly than the protected plants.

The following compounds may be similarly formulated and when used as above give good results.
1-butoxycarbonyl-2-benzimidazolecarbamic acid, methyl ester;
1-butoxycarbonyl-2-benzimidazolecarbamic acid, isopropyl ester.

I claim:
1. The method of controlling mites comprising applying to mites and mite eggs a mite-ovicidally effective amount of a compound of the formula:

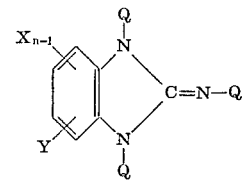

wherein
X is hydrogen, halogen, or alkyl of 1 through 4 carbon atoms;
Y is hydrogen, chlorine, methyl, nitro or alkoxy of 1 through 4 carbon atoms;
$n$ is a positive number less than 5, with the proviso that when X and Y are alkyl their total carbon content be no more than 6 atoms;
the Q's are the same or different and are selected from the group consisting of hydrogen, —$COOR_1$, —$COOR_2$, —$COOR_3$, and M with the proviso that not more than one Q is M and at least one Q is alkoxy-carbonyl;
M is a cation selected from the group consisting of simple metal ions and complexed metal ions capable of additional coordination, said cation forms a salt or chelate with the esters;
and $R_1$ and $R_2$ and $R_3$ are aliphatic of 1 through 16 carbon atoms; aliphatic of 1 through 16 carbon atoms substituted with chlorine, bromine, fluorine, hydroxy, cyano, or alkoxy of 1 through 4 carbon atoms; benzyl; benzyl substituted with halogen, alkoxy of 1 through 4 carbon atoms, alkyl of 1 through 4 carbon atoms, or nitro; phenyl; or phenyl substituted with halogen, alkoxy of 1 through 4 carbon atoms, alkyl of 1 through 4 carbon atoms, or nitro.

2. The method of claim 1 wherein the compound applied is 1-methoxycarbonyl-2-benzimidazolecarbamic acid, methyl ester.

3. The method of claim 1 wherein the compound applied is 2-benzimidazolecarbamic acid, methyl ester.

4. The method of controlling mites comprising applying to mites and mite eggs a mite-ovicidally effective amount of a compound of the formula:

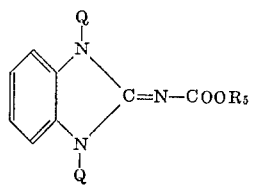

wherein
one Q is —COOR₄; one Q is hydrogen or M;
R₄ is alkyl of 1 through 12 carbon atoms, β-hydroxy ethyl, vinyl, allyl, butenyl, benzyl or propargyl;
R₅ is alkyl of 1 through 4 carbon atoms; and
M is a cation selected from the group consisting of simple metal ions and complex metal ions capable of additional coordination, said cation forms a salt or chelate with the esters.

5. The method of controlling mites comprising applying to mites and mite eggs a mite-ovicidally effective amount of a compound of the formula:

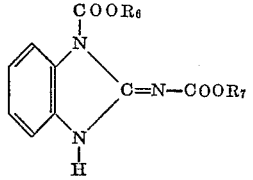

wherein
R₆ is methyl or ethyl and
R₇ is methyl or ethyl.

References Cited

UNITED STATES PATENTS 2,933,502  4/1960  Klopping _____ 167—330
2,933,504  4/1960  Klopping _____ 167—330

OTHER REFERENCES

Ebeling, Subtropical Entomology, p. 580 (1950).

ALBERT T. MEYERS, *Primary Examiner.*

S. FRIEDMAN, *Assistant Examiner.*

U.S. Cl. X.R.

424—27, 29, 218, 219, 134, 151, 226, 215, 187, 195, 249